United States Patent Office 3,784,613
Patented Jan. 8, 1974

3,784,613
PREPARATION OF 2,6-DINITRO-
4-ALKYLPHENOLS
Eddie Vi Ping Tao, Indianapolis, Ind., assignor to Eli
Lilly and Company, Indianapolis, Ind.
No Drawing. Filed June 28, 1971, Ser. No. 157,596
Int. Cl. C07c 79/28
U.S. Cl. 260—622 P                     7 Claims

ABSTRACT OF THE DISCLOSURE 4-alkylphenols are converted to 2,6-dinitro-4-alkylphenols via reaction with nitrogen tetroxide. The end products are useful intermediates in the preparation of certain herbicidally active N,N-disubstituted-2,6-dinitro-4-alkylanilines disclosed in United States Pat. 3,257,190 and British Pat. No. 917,253.

BACKGROUND OF THE INVENTION

(1) Field of the invention

This invention relates to the nitration of alkylphenols. In particular the invention relates to preparing 2,6-dinitro-4-alkylphenols.

(2) Discussion of the prior art

The 2,6-dinitro-4-alkylphenols of this invention are useful intermediates for the preparation of herbicidally active end products. The hydroxyl group of these phenols is readily replaced by chlorine using, for example, the procedure disclosed by Matsumoto, Journal of Pharmaceutical Society of Japan, 85, 544 (1965). Heating the resultant 2,6-dinitro-4-alkylchlorobenzene with a secondary amine, such as di-n-propylamine, in an inert solvent yields the corresponding herbicidally active N,N-disubstituted-2,6-dinitro-4-alkylaniline. These herbicidal products and their preparation from the 2,6-dinitrochlorobenzenes are more fully disclosed in United States Pat. 3,257,190 and British Pat. No. 917,253.

Commercial success of such compounds is dependent upon the economics of their production. Obviously a high quality product must be produced cheaply enough for the farmer to justify its use. However, today "economic" doesn't simply mean producing a compound as cheaply as possible. Responsible process development requires constant attention to the environmental implications of the desired process.

The subject process provides a simple, economic method for producing high yields of 2,6-dinitro-4-alkylphenol intermediates. In addition the reaction possesses the desirable advantage of not producing by-products, such as nitric acid, in amounts deleterious to the environment.

SUMMARY OF THE INVENTION

In accordance with this invention, 2,6-dinitro-4-alkylphenols containing from one to six carbon atoms in the alkyl radical are prepared by reacting nitrogen tetroxide and a 4-lower-alkylphenol. Preferably the reaction is carried out in solution in acetonitrile, although in general any inert organic solvent, such as nitromethane can be employed.

The method of this invention possesses advantage in that a high yield of the desired dinitro compound of superior quality is produced. Also, the reaction mixture, after the reaction has been quenched, contains very little nitric acid, so that disposal is not difficult.

DETAILED DESCRIPTION OF THE INVENTION

The 4-alkylphenols suitable for use as starting materials in the process include para-cresol, 4-isopropylphenol, 4-tertiarybutylphenol and the like. Preferably, the reaction is carried out at a temperature within the range from 0° to 35° C. (still more preferably, 5° to 30° C.), although both lower and high reaction temperatures can be used.

In general, at least two moles of nitrogen tetroxide per mole of 4-alkylphenol should be added to the reaction mixture to provide for the introduction of two nitro groups into the alkylphenol starting compound, and, preferably, from two to three moles of nitrogen tetroxide per mole of 4-alkylphenol are added to the reaction mixture.

The addition of the nitrogen tetroxide generally requires about thirty minutes or less, while the temperature is maintained within the range from 0° to 35° C. The reaction is generally stirred from about three to about seven hours after the addition of nitrogen tetroxide is complete.

As the specific examples illustrate, the amount of solvent present in the reaction mixture is not critical, and can be varied widely. Suitably from 0.25 to 10 volumes of solvent per volume of nitrogen tetroxide can be introduced into the reaction mixture, although both greater and lesser amounts can also be introduced.

The following examples illustrate the invention and tertiarybutylphenol.

EXAMPLE I 15 gm. (0.1 mole) of 4-tertiarybutylphenol was dissolved in 50 ml. of acetonitrile, and the mixture was cooled to 10° C.

14 ml. of $N_2O_4$ (0.22 mole, density 1.45 gm. per ml.) was dissolved in 10 ml. of cold (about 10° C.) acetonitrile, and the solution was added dropwise to the solution described in the preceding paragraph over a period of thirty minutes while the temperature of the reaction mixture was maintained between about 10° and 15° C. The dark solution which was formed was stirred for an additional three hours at about 8°–10° C., at the end of which time no mononitro compound was present in the reaction mixture.

The reaction mixture was then poured into a mixture of ice and water, whereby a precipitate was formed. The precipitate was separated by filtration and was then washed with water. Vapor phase chromatography indicated that the precipitate, amounting to about 18 grams, contained about 93.4 percent by weight of 2,6-dinitro-4-tertiarylbutylphenol.

EXAMPLE II

A solution containing nitrogen tetroxide (14 ml., 0.22 mole, density 1.45 gm. per ml.) in 30 ml. of cold acetonitrile was placed in a 250 ml., 3-necked flask and was cooled to 0° C.

A solution containing 40 ml. of acetonitrile and 4-tertiarybutylphenol (15 gm., 0.1 mole) was added to the solution described in the preceding paragraph dropwise between 3–5° C. (maximum 8° C.). The dark solution was then stirred for five hours at 0–5° C. No mononitro-tertiarybutylphenol was detected at that time. Following this, the reaction mixture was poured into a mixture of ice and water, whereby a precipitate was formed. The precipitate was removed by filtration, and was washed with water. The precipitate amounted to 17.5 gm. and contained 93.1 percent by weight of 2,6 - dinitro - 4 - tertiarybutylphenol according to vapor phase chromatography.

EXAMPLE III

A solution containing nitrogen tetroxide (32 ml., 0.5 mole, density about 1.45 gm. per ml.) in 15 ml. of cold acetonitrile was placed in a 250 ml., 3-necked flask and was cooled to 10° C.

The solution containing 40 ml. of acetonitrile and 4-isopropylphenol (27.2 gm., 0.2 mole) was added dropwise to the solution described in the preceding paragraph at 10–25° C. The green solution was stirred for one hour at 5–25° C., and was thereafter stirred for four hours at room temperature. The green solution was then poured into a mixture of ice and water, whereby a precipitate was formed. The precipitate was washed with water and then air-dried to give 35.6 gm. of material which contained 99.65 percent by weight of 2,6-dinitro-4-isopropylphenol according to vapor phase chromatography.

EXAMPLE IV

A solution containing nitrogen tetroxide (30 ml., 0.47 mole) in 15 ml. of cold acetonitrile was placed in a 250 ml., 3-necked flask and was cooled to 10° C.

A solution containing 40 ml. of acetonitrile and 4-isopropylphenol (27.2 gm., 0.2 mole) was added dropwise to the solution described in the preceding paragraph at 10–30° C. The green solution was stirred at room temperature for seven hours, and was then poured into a mixture of ice and water whereby a precipitate was formed. The precipitate was removed by filtration, was washed with water, and was then air-dried to yield 37 gm. of product which analyzed 99.3 percent by weight of 2,6-dinitro-4-isopropylphenol by vapor phase chromatography.

EXAMPLE V

A solution containing nitrogen tetroxide (25 ml., 0.39 mole) and 20 ml. of cold acetonitrile was placed in a 250 ml., 3-necked flask and was cooled to 10° C.

A solution containing para-cresol (21.6 gm., 0.2 mole) and 10 ml. of acetonitrile was added dropwise to the solution described in the preceding paragraph at 20–30° C. The solution was stirred at 25–30° C. for seven hours, and was poured into a mixture of ice and water, whereby a precipitate was formed. The precipitate was separated by filtration, washed with water, and air-dried to give 26.1 gm. of product analyzing 99.3 percent by weight of 2,6-dinitro-4-methylphenol by vapor phase chromatography.

EXAMPLE VI

A solution containing nitrogen tetroxide (26 ml., 0.41 mole) and 5 ml. of cold acetonitrile was cooled to 10° C.

A solution containing 4-tertiaryamylphenol (0.2 mole, 32.8 gm.) and 35 ml. of acetonitrile was added dropwise to the solution described in the preceding paragraph at 10–22° C. The dark solution was stirred at about 20° C. for seven hours, and was then poured into a mixture of ice and water, whereby a precipitate was formed. The precipitate was washed with water and air-dried to yield an oil. The oil was recrystallized from 90 percent methanol to give 11.9 gm. of product analyzing 95.2 percent by weight of 2,6-dinitro-4-tertiaryamylphenol by vapor phase chromatography. The crystals melted at 62–64° C.

EXAMPLE VII

A solution of cold nitrogen tetroxide (26 ml., 0.41 mole) in 15 ml. of cold acetonitrile was prepared in a 250 ml. flask.

To the solution described in the preceding paragraph there was added a solution of 4-isopropylphenol (27.2 gm.) in 28 ml. of acetonitrile over a period of 37 minutes while the temperature of the reaction mixture was maintained at 8–12° C. A sample taken about 35 minutes later contained 16.5 percent by weight of mononitro-4-isopropylphenol, and a sample taken three and one-half hours later (including the 35 minute period just mentioned) contained 4.1 percent by weight of mononitro-4-isopropylphenol. Twelve minutes still later the reaction mixture was heated to 60° C. over a period of five and one-half minutes, and was then cooled to 20° C. in three minutes. The reaction mixture was quenched in a mixture of 100 grams of ice and 200 grams of water, whereby a precipitate was formed. The reaction mixture was then stirred for one-half hour and thereafter was filtered. The solid material separated by filtration was washed five times with 100 ml. of water each time, and the solid material was air-dried overnight to yield a product (about 39 gm.) containing 98.3 percent by weight of 2,6-dinitro-4-isopropylphenol.

EXAMPLE VIII

A solution of nitrogen tetroxide (26 ml., 0.41 mole) in 15 ml. of cold acetonitrile was prepared in a 250 ml. flask.

To the solution described in the preceding paragraph a solution of 4-isopropylphenol (27.2 gm.) and 28 ml. of acetonitrile was added over a period of 37 minutes while the reaction temperature was maintained at 5–13° C. The reaction mixture was then stirred at room temperature for seven hours, and was then admixed with a mixture of ice and water, whereby a precipitate was formed. The reaction mixture was stirred for an additional one-half hour, was filtered, and the solid material separated by filtration was washed with water five times with 100 ml. of cold water each time. The solid material was then air-dried overnight to yield 40 gm. of material analyzing 98.8 percent by weight of 2,6-dinitro-4-isopropylphenyl.

EXAMPLE IX

A mixture of nitrogen tetroxide (120 ml., 2.05 mole) and 75 ml. of acetonitrile was chilled in a two-liter, three-necked flask.

To the mixture described in the preceding paragraph there was added a solution containing 136 gm. of 4-isopropylphenol and 140 ml. of acetonitrile over a period of 54 minutes while the reaction mixture was maintained at 6–17° C. After seven hours (including the 54 minutes addition time), 1500 ml. of cold water was added to the reaction mitxure, whereby the temperature of the reaction mixture was dropped to 12° C. A precipitate formed, and after having been stirred for one-half hour the precipitate was separated by filtration. The solid material separated was washed with water and was air-dried overnight to yield 197.3 gm. of material analyzing 98.5 percent by weight of 2,6-dinitro-4-isopropylphenol by vapor phase chromatography.

What is claimed is:
1. A method for the preparation of a compound of the formula

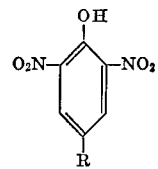

which comprises reacting in an inert organic solvent at a temperature between 0 and 35° C. an alkylphenol of the formula

with nitrogen tetroxide, R in the preceding formulas being an alkyl radical containing from one to six carbon atoms.
2. The method of claim 1 wherein R is methyl.
3. The method of claim 1 wherein R is isopropyl.
4. The method of claim 1 wherein R is tertiary butyl.
5. The method of claim 1 wherein R is tertiary amyl.
6. The method of claim 1 wherein from two to three moles of nitrogen tetroxide per mole of said alkylphenol are introduced into the reaction mixture.

7. The method of claim 1 wherein the inert organic solvent is acetonitrile.

References Cited

UNITED STATES PATENTS

| | | | |
|---|---|---|---|
| 3,221,062 | 11/1965 | Wright | 260—622 |
| 3,510,527 | 5/1970 | Prosser | 260—622 |

FOREIGN PATENTS

| | | | |
|---|---|---|---|
| 124,753 | 3/1919 | Great Britain | 260—622 R |
| 1,070,755 | 6/1967 | Great Britain | 260—622 R |

BERNARD HELFIN, Primary Examiner

W. B. LONE, Assistant Examiner